United States Patent
Vestama et al.

(10) Patent No.: US 9,385,552 B2
(45) Date of Patent: Jul. 5, 2016

(54) METHOD OF DETECTING CHARGER TYPE AND ESTIMATING REMAINING RECHARGING TIME FOR MOBILE DEVICES WITH USB RECHARGING

(75) Inventors: Mikael Vestama, Helsinki (FI); Kari Rissanen, Espoo (FI); Jussi Ruutu, Espoo (FI)

(73) Assignee: Nokia Technologies Oy, Espoo (FI)

( * ) Notice: Subject to any disclaimer, the term of this patent is extended or adjusted under 35 U.S.C. 154(b) by 605 days.

(21) Appl. No.: 12/911,060

(22) Filed: Oct. 25, 2010

(65) Prior Publication Data

US 2012/0098500 A1 Apr. 26, 2012

(51) Int. Cl.
- H02J 7/00 (2006.01)
- H02J 7/16 (2006.01)
- G01R 31/36 (2006.01)
- H01M 10/44 (2006.01)
- H01M 10/48 (2006.01)

(52) U.S. Cl.
CPC ............ H02J 7/0055 (2013.01); H01M 10/44 (2013.01); H01M 10/48 (2013.01); H02J 7/0047 (2013.01); *H02J 2007/0062* (2013.01); *H02J 2007/0098* (2013.01)

(58) Field of Classification Search
CPC ..... H02J 7/0001; H02J 7/0004; H02J 7/0008; H02J 7/0011
USPC ............ 702/63; 320/132, 134, 137, 149, 155, 320/106
See application file for complete search history.

(56) References Cited

U.S. PATENT DOCUMENTS

| | | | | |
|---|---|---|---|---|
| 5,572,110 A | * | 11/1996 | Dunstan | 320/106 |
| 6,025,695 A | * | 2/2000 | Friel | H01M 10/4257 112/130 |
| 6,078,871 A | * | 6/2000 | Anderson | G01R 31/3648 320/128 |

(Continued)

FOREIGN PATENT DOCUMENTS

| | | | | |
|---|---|---|---|---|
| JP | 10178747 | | 6/1998 | |
| JP | 10178747 A | * | 6/1998 | H02J 7/04 |

(Continued)

OTHER PUBLICATIONS

Texas Instruments Production Data Information; bq27501; System-Side Impedance Track (TM) Fuel Gauge ; SLUS879A—Oct. 2008—Revised Jun. 2009; Copyright (c) 2008-2009, Texas Instruments Inc.

(Continued)

*Primary Examiner* — Richard Isla Rodas
*Assistant Examiner* — Michael Dibenedetto
(74) *Attorney, Agent, or Firm* — Locke Lord LLP

(57) ABSTRACT

Method, apparatus, and computer program product embodiments are disclosed for estimating the remaining charging time of a rechargeable battery. An example embodiment of the invention comprises a method comprising the steps of detecting an availability of a charging device to a battery in an apparatus; determining a type of the charging device by measuring its charging characteristics for charging the battery in the apparatus and comparing its measured charging characteristics with stored charging characteristics of a plurality of chargers, adapters, or charger-adapter combinations; measuring charging current of the battery; and calculating a time remaining to charge the battery based on a comparison of the measured charging current with the stored charging characteristics.

18 Claims, 9 Drawing Sheets

(56) References Cited

U.S. PATENT DOCUMENTS

| | | | |
|---|---|---|---|
| 6,456,037 B1* | 9/2002 | Jakl et al. | 320/106 |
| 6,639,385 B2* | 10/2003 | Verbrugge et al. | 320/132 |
| 6,756,768 B2* | 6/2004 | Okada | 320/132 |
| 6,888,354 B1 | 5/2005 | Gofman | |
| 6,928,372 B2* | 8/2005 | Pozsgay | H02J 7/0052 320/132 |
| 7,382,110 B2* | 6/2008 | Hogari | G01R 31/361 320/132 |
| 7,528,576 B2 | 5/2009 | Ukon | |
| 7,565,458 B2* | 7/2009 | Thijssen et al. | 710/16 |
| 7,630,842 B2* | 12/2009 | Murakami | 702/64 |
| 7,667,429 B2* | 2/2010 | Little | G06F 21/31 320/106 |
| 7,667,483 B2* | 2/2010 | Kwean | 326/30 |
| 7,751,994 B2* | 7/2010 | Matsumura et al. | 702/63 |
| 7,888,913 B1* | 2/2011 | Marty et al. | 320/132 |
| 8,193,766 B2* | 6/2012 | Rondoni | A61N 1/37247 320/108 |
| 8,358,108 B2* | 1/2013 | Seman et al. | 320/134 |
| 8,417,292 B2* | 4/2013 | Kim et al. | 455/557 |
| 2004/0135548 A1* | 7/2004 | Takano et al. | 320/132 |
| 2005/0020322 A1 | 1/2005 | Ruuska et al. | |
| 2006/0229113 A1 | 10/2006 | Rowse | |
| 2007/0096691 A1 | 5/2007 | Duncan et al. | |
| 2007/0123316 A1 | 5/2007 | Little | |
| 2007/0145945 A1* | 6/2007 | McGinley et al. | 320/114 |
| 2008/0081608 A1 | 4/2008 | Findikli et al. | |
| 2008/0296978 A1 | 12/2008 | Finkenzeller et al. | |
| 2009/0100258 A1* | 4/2009 | Sung | 713/100 |
| 2009/0108805 A1 | 4/2009 | Liu et al. | |
| 2009/0128346 A1* | 5/2009 | Zhao et al. | 340/636.15 |
| 2009/0130874 A1* | 5/2009 | Englund | 439/131 |
| 2009/0184688 A1* | 7/2009 | Kim et al. | 320/162 |
| 2009/0189569 A1* | 7/2009 | Hsu | H02J 7/0072 320/160 |
| 2009/0273318 A1 | 11/2009 | Rondoni et al. | |
| 2010/0105324 A1 | 4/2010 | Takayama | |
| 2010/0196043 A1* | 8/2010 | Hamaya | 399/88 |
| 2011/0234152 A1* | 9/2011 | Frossen et al. | 320/107 |

FOREIGN PATENT DOCUMENTS

| | | |
|---|---|---|
| JP | 2006262605 A * | 9/2006 |
| JP | 2006262605 | 9/2009 |

OTHER PUBLICATIONS

2_BlackBerry App World; Battery Status; http://appworld.blackberry.com/webstore/content/5360.

Better display of Battery Charge Level; http://maemo.org/community/brainstorm/view/better_display_of_battery_charge_level/ ; Sep. 9, 2010.

* cited by examiner

METHOD OF DETECTING CHARGER TYPE AND ESTIMATING REMAINING RECHARGING TIME FOR MOBILE DEVICES WITH USB RECHARGING

FIELD

The field of the invention relates to estimating the remaining charging time of a rechargeable battery.

BACKGROUND

Batteries are essential for the portability of wireless terminals, for example cellular phones and other portable communication devices. Rechargeable batteries in cellular phones and other portable communication devices, such as NiCd, nickel-metal hydride (NiMH), Lithium-ion, lithium iron phosphate (LiFePO$_4$), and Lithium-Polymer batteries, may be recharged with household alternating current (AC) power coupled through a voltage reduction transformer, an alternating-to-direct current converter, and appropriate battery monitoring and charging circuits. They may also be recharged with a 12-volt cigarette lighter socket provided in an automobile coupled through a DC voltage reduction circuit and appropriate battery monitoring and charging circuits. They may also be recharged using solar cell, windmill, another battery or any other suitable power source. However, typical battery chargers do not provide a reliable estimate of the remaining charging time needed until the battery is charged to its maximum capacity.

SUMMARY

Method, apparatus, and computer program product embodiments are disclosed for estimating the remaining charging time of a rechargeable battery.

An example embodiment of the invention comprises a method comprising the steps of:

detecting an availability of a charging device to a battery in an apparatus;

determining a type of the charging device by measuring its charging characteristics for charging the battery in the apparatus and comparing its measured charging characteristics with stored charging characteristics of a plurality of chargers, adapters, or charger-adapter combinations;

measuring charging current of the battery; and calculating a time remaining to charge the battery based on a comparison of the measured charging current with the stored charging characteristics.

In example embodiments of the invention, the charging device may be a charger, an adapter, or a charger-adapter combination.

An example embodiment of the invention comprises a computer readable medium, comprising program instructions, which when executed by a computer processor, perform the steps of:

detecting an availability of a charging device to a battery in an apparatus;

determining a type of the charging device by measuring its charging characteristics for charging the battery in the apparatus and comparing its measured charging characteristics with stored charging characteristics of a plurality of chargers, adapters, or charger-adapter combinations;

measuring charging current of the battery; and calculating a time remaining to charge the battery based on a comparison of the measured charging current with the stored charging characteristics.

An example embodiment of the invention comprises an apparatus, comprising:

at least one processor;

at least one memory including computer program code;

the at least one memory and the computer program code configured to, with the at least one processor, cause the processor at least to:

detect an availability of a charging device to a battery in the apparatus;

determine a type of the charging device by measuring its charging characteristics for charging the battery in the apparatus and comparing its measured charging characteristics with stored charging characteristics of a plurality of chargers, adapters, or charger-adapter combinations;

measure charging current of the battery; and calculate a time remaining to charge the battery based on a comparison of the measured charging current with the stored charging characteristics.

An example embodiment of the invention comprises an apparatus, comprising:

means for detecting an availability of a charging device to a battery in the apparatus;

means for determining a type of the charging device by measuring its charging characteristics for charging the battery in the apparatus and comparing its measured charging characteristics with stored charging characteristics of a plurality of chargers, adapters, or charger-adapter combinations;

means for measuring charging current of the battery; and means for calculating a time remaining to charge the battery based on a comparison of the measured charging current with the stored charging characteristics.

The resulting example embodiments of the invention enable estimating the remaining charging time of a rechargeable battery.

DISCUSSION OF EXAMPLE EMBODIMENTS OF THE INVENTION

Figure 1A:
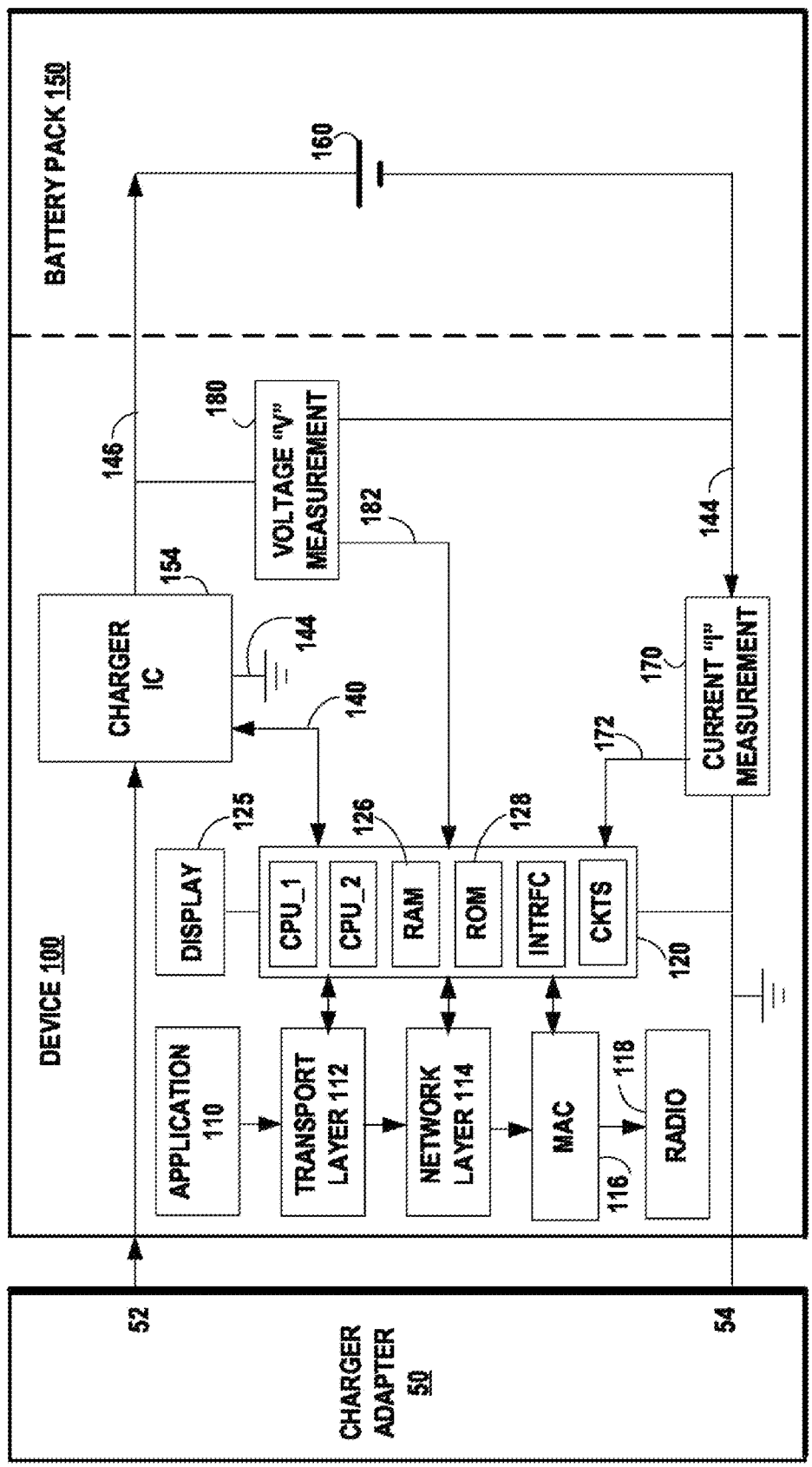
FIG. 1A illustrates an example embodiment for estimating the remaining charging time of a rechargeable battery, in accordance with an embodiment of the invention.

A rechargeable battery is an electrochemical cell whose reactions are electrically reversible. Rechargeable power sources such as super-capacitors or batteries in cellular phones and other portable communication devices, such as NiCd, nickel-metal hydride (NiMH), lithium iron phosphate (LiFePO4), Lithium-ion, and Lithium-Polymer batteries, may be recharged with a charger powered with household alternating current (AC) power coupled through a voltage reduction transformer, an alternating-to-direct current converter, and appropriate battery monitoring and charging circuits. The charger provides a DC charging current that is converted in the battery into chemical energy stored at the electrodes of the battery. In an alternative embodiment the batteries may be charged from a direct current source for example from a portable device, an external battery pack, a solar panel or another external/internal power source. The capacity of a battery is the quantity of electrical charge stored in the battery at a given level. The capacity of a fully charged battery is usually measured in amp-hours (AH) or milliamp-hours (mAH), and is a measure of the size of the battery. An electrical charge of one amp-hour is 3600 Coulombs or a milliamp-hour is 3.6 Coulombs. As the charging current delivers electrical charge to the battery, the energy of the battery increases and is determined by the product of the charge stored and the battery voltage. FIG. 1A illustrates an example embodiment of the invention for estimating the remaining charging time of a rechargeable battery 160 in a battery pack 150. The example apparatus, such as a wireless device or terminal 100 and the example battery pack 150 are connected to an example charger adapter 50, in accordance with an embodiment of the invention. The wireless device 100 may be a communications device, such as a cell phone, portable radio, portable TV, personal digital assistant (PDA), laptop computer, palmtop computer, or the like, capable of communicating in a personal area network (PAN), local area network (LAN), or wide area network (WAN).

The example battery pack 150 of FIG. 1A comprises the battery 160. In an alternative embodiment the battery 160 may comprise several batteries or cells. The charger adapter 50 provides a DC voltage up to a maximum current, but does not regulate the voltage and current at programmed levels. The charger adapter 50 has its positive output terminal 52 connected over line 146 to the charger integrated circuit (IC) 154. The charger IC 154 outputs a regulated current and voltage to charge the positive terminal of battery 160. The charging current from the negative terminal of battery 160 passes over line 144 and through the current measurement module 170 to the ground terminal 54 of the charger adapter. The current measurement module 170 provides current measurement values "I" on line 172 to the processor 120 of the device 100. The voltage measurement module 180 is connected across the terminals of the battery 160 and provides voltage measurement values "V" on line 182 to the processor 120 of the device 100. The processing module 120 of the device 100 is programmed to control the charger IC 154 over line 140 to apply charging current and voltage to the battery 160 in accordance with a constant current/constant voltage charging process.

In the example embodiment of the device 100 in FIG. 1A, the processor 120 in device 100 executes computer program code stored in the memory 126 and/or 128 to cause the device 100 to detect the availability of a charging device 50 to the battery 160 in the battery pack 150 associated with the device 100. The processor 120 executes the computer program code to determine the type of the charging device 50 by measuring its charging characteristics for charging the battery 160 and comparing its measured charging characteristics with stored charging characteristics previously stored in the memory 126 and/or 128 of a plurality of chargers, adapters, or charger-adapter combinations. The processor 120 executes computer program code to cause the current measurement module 170 in device 100 to measure the charging current of the battery 160 being charged by the charging device 50. The processor 120 executes the computer program code to calculate the time remaining to charge the battery 160 based on a comparison of the measured charging current with the stored charging characteristics. The charging device 50 may be charger, an adapter, or a charger-adapter combination.

The example wireless device or terminal 100 of FIG. 1A comprises a protocol stack, including the radio 118 and the media access control (MAC) 116, which may be based, for example, on various cellular telephone network standards, wireless local area network (LAN) standards, or other wireless communications standards. Other network types may make use of example embodiments of the invention. The protocol stack may also comprise a network layer 114, a transport layer 112, and application programs 110. The example wireless device 100 includes a processor 120 that may include a dual core central processing unit (CPU) CPU_1 and CPU_2, a random-access memory (RAM) memory 126, a read-only memory (ROM) memory 128, an interface for a keypad, display, and other input/output devices, and circuits (CKTS) to carry out the functions of the example embodiments. The interface circuits may interface with one or more radio transceivers, battery and other power sources, key pad, touch screen, display, microphone, speakers, ear pieces, camera or other imaging devices, etc. The RAM and ROM may be removable memory devices such as smart cards, SIMs, wireless identification modules (WIMs), semiconductor memories such as RAM, ROM, programmable read-only memories (PROMS), flash memory devices, etc. The processor protocol stack layers, and/or application program may be embodied as program logic stored in the RAM and/or ROM in the form of sequences of programmed instructions which, when executed in the CPU, carry out the functions of the disclosed embodiments. The program logic may be delivered to the writeable RAM, PROMS, flash memory devices, etc. of the coexistence enabler and processor from a computer program product or article of manufacture in the form of computer-usable media such as resident memory devices, smart cards or other removable memory devices. Alternately, they may be embodied as integrated circuit logic in the form of programmed logic arrays or custom designed application specific integrated circuits (ASIC). The one or more radios in the device 100 may be separate transceiver circuits or alternately, the one or more radios may be a single radio frequency (RF) module capable of handling one or multiple channels in a high speed, time and frequency multiplexed manner in response to the processor.

In an example embodiment of the invention, the battery 160 may not be separate from the device 100, but instead, the battery 160 may be integrated into the device 100. In an example embodiment of the invention, there may be a plurality of batteries 160 that may be of the same type or of different types. An example embodiment of the invention may be applied to a subset of the plurality of batteries 160 or to all of the plurality of batteries 160. An example embodiment of the invention may be applied to each battery individually of a plurality of batteries 160. If applied to a plurality of batteries 160, an example embodiment of the invention, may effectively treat the plurality of batteries as a single integrated battery 160. The description above is for the case of a single battery 160, but it should be understood that the description may be applied to a plurality of batteries 160.

In an example embodiment of the invention, there may be a plurality of chargers, adapters 50, or charger-adapter combinations whose charging characteristics were previously measured and stored in the memory 126 and/or 128. For example, the device 100 may be a mobile device that may be charged with both with a universal serial bus (USB) port of a personal computer and, at a different time, charged with a wall charger. In such an example, an embodiment of the invention may compare the measured characteristics of the battery 160 with the stored characteristics of each individual charger type or it may be compared with the stored characteristics of a plurality of types of chargers, adapters, or charger-adapter combinations that may be treated as a single integrated charger.

In an example embodiment of the invention, there may be any combination of a plurality of batteries 160 whose measured characteristics may be compared with the stored characteristics of a plurality of chargers, adapters 50, or charger-adapter combinations whose charging characteristics were previously measured and stored in the memory 126 and/or 128. For example, two types of charger adapters 50 or chargers may be used to recharge two or more batteries 160.

Figure 1B:
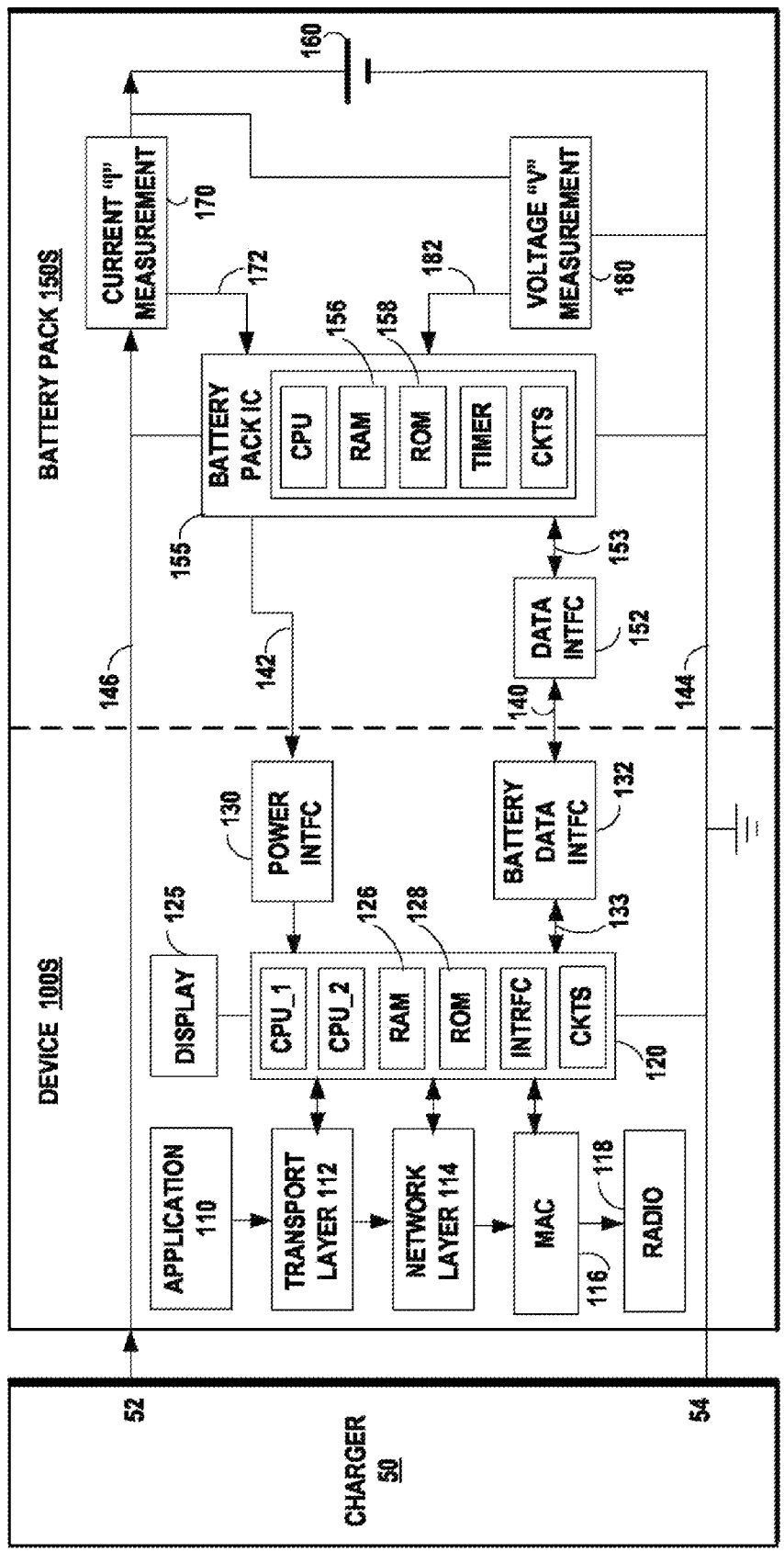
FIG. 1B illustrates an example alternate embodiment for estimating the remaining charging time of a rechargeable battery contained in an example "smart battery" pack, in accordance with an embodiment of the invention.

FIG. 1B illustrates an example alternate embodiment of the invention, for estimating the remaining charging time of a rechargeable battery 160 contained in an example "smart battery" pack 150S. The example apparatus, such as a wireless device or terminal 100S and the example "smart battery" pack 150S are connected to an example charger adapter 50, in accordance with an embodiment of the invention. The example wireless device 100S is configured to use the example "smart battery" pack 150S.

The example "smart battery" pack 150S of FIG. 1B, comprises a battery pack integrated circuit (IC) 155 that comprises a CPU, RAM memory 156, ROM memory 158, a timer, and circuits CKTS to provide a regulated current and voltage over line 142 to the power interface 130 of the device 100S. The charger adapter 50 has its positive output terminal 52 connected over line 146 and through the current measurement module 170 to the positive terminal of the battery 160. The current measurement module 170 provides current measurement values "I" on line 172 to the battery pack integrated circuit (IC) 155. The ground terminal 54 of the charger adapter 50 is connected over line 144 to the negative terminal of the battery 160. The voltage measurement module 180 is connected across the terminals of the battery 160 and provides voltage measurement values "V" on line 182 to the battery pack integrated circuit (IC) 155.

The data exchanged between the device 100S and the battery pack integrated circuit (IC) 155 passes between the processor 120 in the device 100S over the line 133 to the battery data interface 132 in the device 100S, and through the communication line 140 that may be part of a battery connector to the data interface 152 in the "smart battery" pack 150S and over the line 153 to the battery pack integrated circuit (IC) 155. The estimated value of the remaining charging time TREM of a rechargeable battery may be sent from the battery pack integrated circuit (IC) 155 to the processor 120 in the device 100S and displayed to the user on the display 125, in accordance with example embodiments of the invention. In an example embodiment of the invention, the current measurement module 170 and the voltage measurement module 180 may send the respective measurement results directly to the processor 120 in the device 100S, to make the estimation of the remaining charging time TREM of a rechargeable battery 160.

The example charger adapter 50 is a power supply that provides electrical energy to the "smart battery" pack 150S of FIG. 1B. Power supplies may be generally classified as constant-voltage, constant-current, and constant-voltage/constant-current sources. The constant-voltage (CV) power supply provides a DC voltage that may be set to any desired value over a specified range. An ideal constant-voltage supply has a zero output impedance. The constant-current (CC) power supply gives a regulated current independent of the voltage over the load (up to the maximum allowable voltage). The constant-voltage/constant-current (CV/CC) power supply may be used to provide either a constant voltage or a constant current. In an example embodiment of the invention, the charger adapter 50 may be a dedicated charger whose primary function is to provide recharging current. In an example embodiment of the invention, the charger adapter 50 may be a device whose secondary function is to provide recharging current, such as a USB device, while it performs some other primary function, such as data transfer.

Figure 1C:
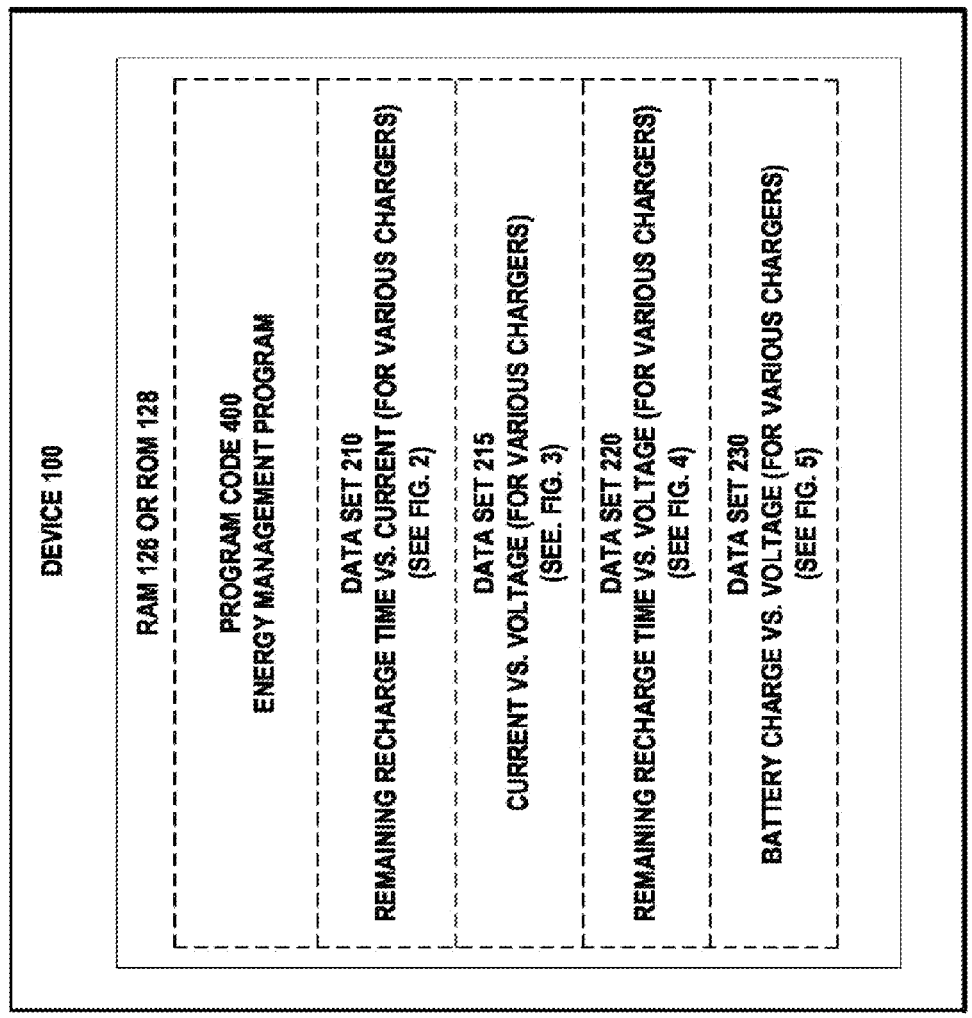
FIG. 1C is an example functional block diagram of the RAM and/or ROM memory of the wireless device of FIG. 1A, storing an energy management program, pre-measured data sets for various chargers, and tracking measurements for the present state of the battery, in accordance with an embodiment of the invention.

FIG. 1C is an example functional block diagram of the RAM 126 and/or ROM 128 memory of the device 100 of FIG. 1A and/or the RAM 156 and/or ROM 158 memory of the "smart battery" pack IC 155 of FIG. 1B, storing an energy management program 400, a pre-measured data set 210 of data points for values of remaining recharge time vs. current for various chargers (see FIG. 2), in accordance with an embodiment of the invention. The RAM and/or ROM memory of the device 100 in FIG. 1A and/or the RAM and/or ROM memory of the "smart battery" pack IC 155 of FIG. 1B, stores data set 215 of current vs. voltage for various chargers (see FIG. 3), in accordance with an embodiment of the invention. The RAM and/or ROM memory of the device 100 of FIG. 1A and/or the RAM 156 and/or ROM 158 memory of the "smart battery" pack IC 155 of FIG. 1B, stores data set 220 of remaining recharge time vs. voltage for various chargers (see FIG. 4), in accordance with an embodiment of the invention. The RAM and/or ROM memory of the device 100 of FIG. 1A and/or the RAM 156 and/or ROM 158 memory of the "smart battery" pack IC 155 of FIG. 1B, stores data set 230 of battery charge vs. voltage for various chargers (see FIG. 5), in accordance with an embodiment of the invention. In an example embodiment of the invention, the data set may be stored in various appropriate data formats. For example, it may be in the form of a table, a mathematical function, or a set of functions that approximate the data.

In example embodiments of the invention, the RAM and/or ROM memory of the device 100 of FIG. 1A and/or the RAM 156 and/or ROM 158 memory of the "smart battery" pack IC 155 of FIG. 1B, may also store data sets of sampled instant current vs. sampled instant voltage, initial charge value, and integrated charge value, in accordance with an embodiment of the invention.

In example embodiments of the invention, the initial condition for a new battery 160 may be that it has not been charged, that is the value of the stored charge Q(0) at sampling time T0 is substantially zero. This value Q(0) typically represents a situation when a mobile device will power down in order not to damage the battery. Only in exceptional situations, such as in emergency calls, will the battery be further discharged, which may damage the condition of the battery. The initial charging of the battery 160 in the battery pack 150, after being placed in the device 100, may be performed by the charger adapter 50, as shown in the graphs of FIGS. 2, 3, 4, and 5. The device 100 may be placed in a minimally powered operating state with only its display indicating that battery charging is taking place. At an initial sampling time T0, the battery is uncharged. At the next sampling time T1, the increment in the charge Q1 that has flowed into the battery is approximately Q$1$=I$1$*(T$1$−T$0$). At the next sampling time T2, the increment in the charge Q2 that has flowed into the battery is approximately Q$2$=I$2$*(T$2$−T$1$) and at that instant T2, the present stored charge capacity that has accumulated in the battery is the sum of Q$1$+Q$2$. At any sampling time Tj, the present stored charge capacity that has accumulated in the battery is the sum of Q$1$+Q$2$+ . . . +Qj. At the end of the charging operation, at a final sampling time T9, when the battery 160 has reached its maximum stored charge capacity, the charge that has accumulated in the battery is the sum of the incremental charges Q$1$+Q$2$+ . . . +Q$9$. The values of the charge increments Qi may be computed from the values of the current Ii measured by the current measurement module 170 at each sampling time Ti. The measured and computed values may be stored in the records [Ii Vi Qi Ti] in a dataset in the RAM 126 and/or ROM 128 memory of the device 100 and/or the RAM 156 and/or ROM 158 memory of the battery pack IC 155. The records [Ii Vi Qi Ti] may be available for monitoring and managing the battery in the following example processes. The records [Ii Vi Qi Ti] may be stored as directly measured data (for example, as a table), or as processed data (for example, a mathematical function fitted to measured data). Example embodiments of the invention are disclosed for estimating the remaining charging time of a rechargeable battery.

An example embodiment of the invention may comprise three parts: 1) determining what type of charger is used in recharging, 2) estimating the remaining recharging time (RRT), and 3) adjusting on demand the estimation according to the device usage.

An example embodiment of the invention comprises a method comprising the steps of:

detecting an availability of a charging device to a battery in an apparatus;

determining a type of the charging device by measuring its charging characteristics for charging the battery in the apparatus and comparing its measured charging characteristics with stored charging characteristics of a plurality of chargers, adapters, or charger-adapter combinations;

measuring charging current of the battery being charged by the charging device; and calculating a time remaining to charge the battery based on a comparison of the measured charging current with the stored charging characteristics.

The charging device may be a charger, an adapter, or a charger-adapter combination. There may be a plurality of chargers, adapters, or charger-adapter combinations whose charging characteristics were previously measured and stored in the memory.

The charger adapter 50 type is identified based on voltage vs. current characteristics that are unique for different types of chargers. This can be seen as analogous to a "fingerprint". Once the charger adapter 50 type is identified, then the remaining recharging time is estimated using Remaining Recharging Time (RRT) vs. battery 160 voltage characteristics that were previously measured for this charger adapter 50.

In an example embodiment of the invention, if the device 100 is used during recharging or the charger adapter 50 is of unknown type, then the embodiment may adapt by interpolating between the stored characteristics of the two closest chargers. The approximation uses the stored data sets for the remaining recharging time vs. voltage curves of the two closest chargers and bases the interpolated recharging time estimate on the average of the two curves. An example embodiment of the invention comprises interpolating stored values characterizing plural types of chargers for an unidentified charger adapter 50 type and using the interpolated values to calculate a time remaining to charge the battery 160 with the unidentified charger adapter 50 type.

Figure 2:
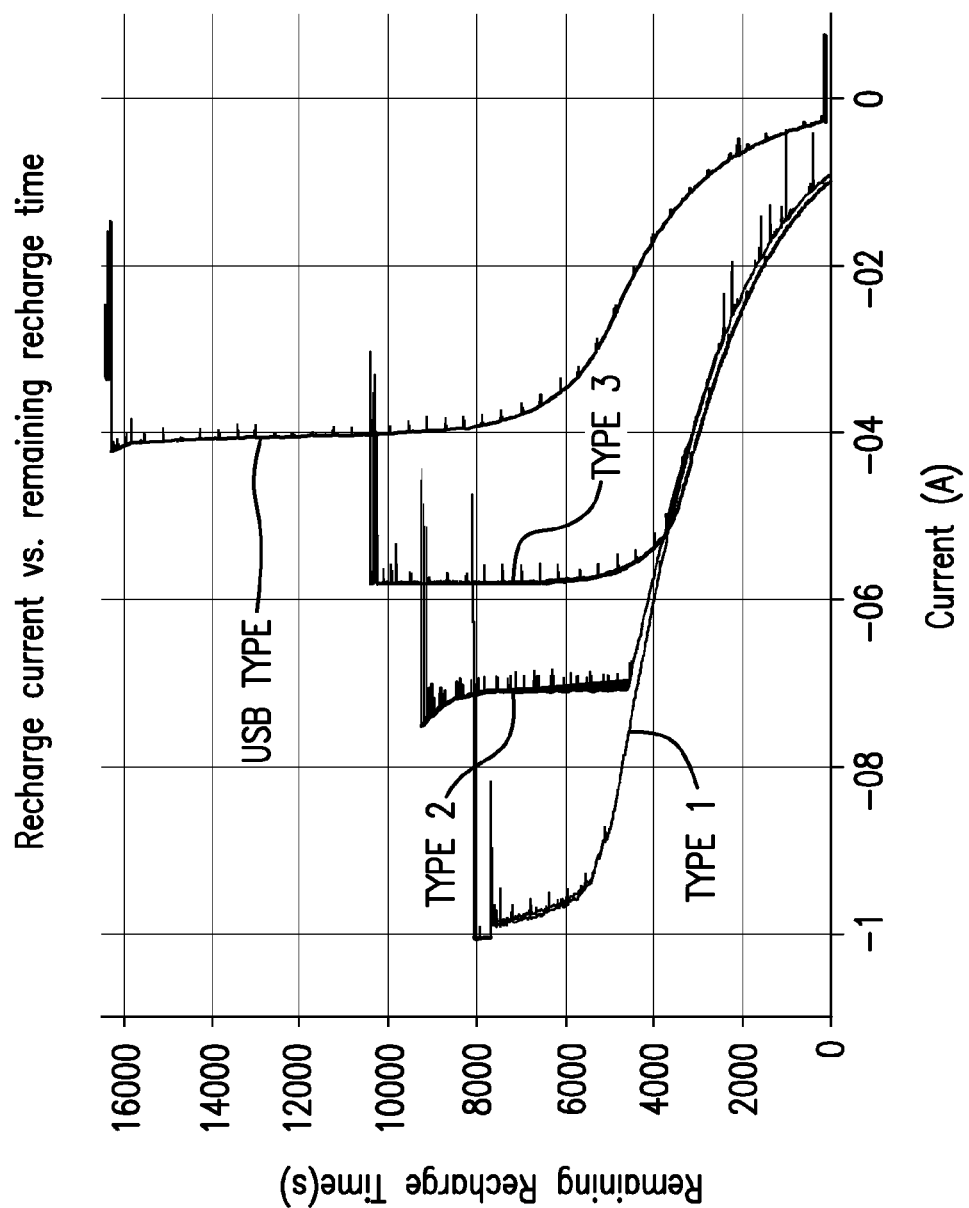
FIG. 2 is an example graph of remaining recharge time vs. current (for various chargers), in accordance with an embodiment of the invention.

FIG. 2 shows the measured recharging currents for four different types of chargers 50, labeled TYPE 1, TYPE 2, TYPE 3, and USB TYPE, when battery 160 has been recharged from empty to full. Depending on the charger, the recharging current varies and, therefore, the recharging time also varies. For example, if a dedicated type 1 charger adapter 50 is used, the total recharging time may be roughly 8000 seconds. However, if the device 100 is charged from a personal computer's USB port, the recharging time may be about 16000 seconds. One of the steps in estimating the remaining recharge time is to determine what type of charger is used to recharge the battery 160 in device 100. If the charger adapter 50 type is determined, it is possible to give an estimate for the remaining recharging time.

Figure 3:
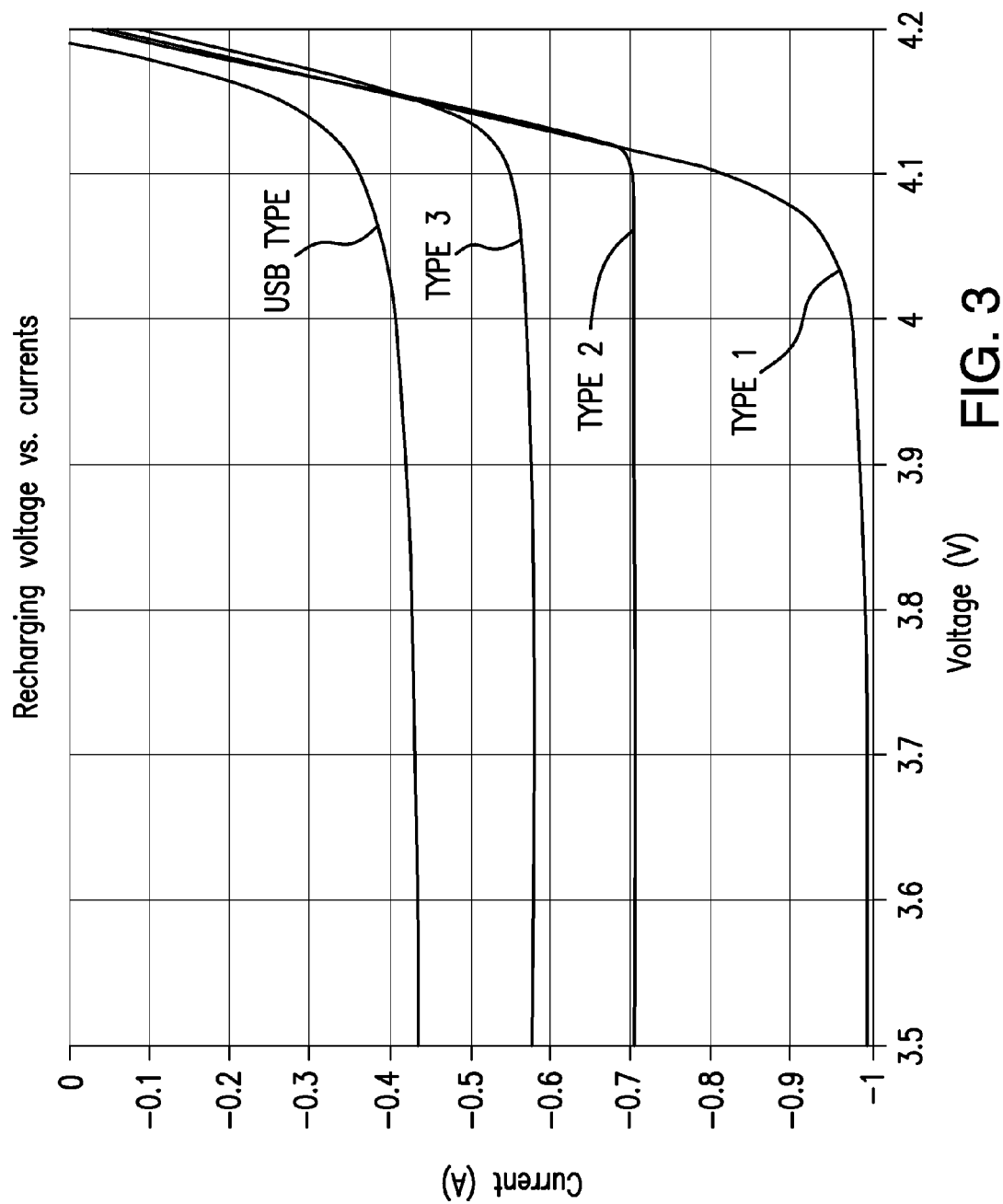
FIG. 3 is an example graph of current vs. voltage (for various chargers), in accordance with an embodiment of the invention.

In order to determine the charger type, the recharging characteristics ("fingerprint") of each type of charger adapter 50 needs to be determined for the combination of the device 100 type and the battery 160 type. Since a single measurement may not be statistically significant due to noise, for example, repetition of the measurement cycle may be applied to obtain statistically significant results. The actual measurements may be performed by keeping a log of both the recharging current and battery 160 voltage during the recharging. FIG. 3 shows the results when the recharging currents of different chargers 50 are plotted against the battery 160 voltage during recharging for repetition of the measurement cycles that may be averaged to get a more reliable recharging characteristic. In the beginning of recharging (i.e. when battery 160 voltage is below 3.8V), there may be some fluctuation in the recharging currents, but soon afterward the currents stabilize and portray predictable behavior. Initially, the recharging currents stay substantially at the constant level (between voltages approximately 3.8V-4.0V), after which they begin to approach zero. The period when the recharging currents stay at constant level may be quite long. From FIG. 2 it may be determined that this period may last between 2000 s (for the TYPE 1 charger within the range from H$0$+5750 s to H$0$+7750 s) and 10000 s (for the USB port type charger recharging within the range from H$0$+6250 s to H$0$+16250 s), when the recharging was begun with an empty battery 160. Therefore, during this time, it is easy to detect what type of charger adapter 50 is in question, simply by observing the recharging currents. For example, if the recharging current is about ~1000 mA, it may indicate that the charger adapter 50 being used in recharging may be a TYPE 1 charger. However, if the recharging current is about ~700 mA, then the charger adapter 50 may be a TYPE 2 charger. When the charger type is known, it is then possible to estimate for the remaining recharging time.

However, when the battery 160 is almost fully charged, i.e. when battery 160 level is above 4.1V, determining the charger adapter 50 type may be more difficult. As noted from FIG. 3, the recharging currents of each wall charger type may be very close to each other. This makes the determination of charger type more difficult. However, if recharging currents are the same or almost the same, at least when estimating the remaining recharging time, then the determination of the remaining charging time is not as strongly dependent on the charger type. This may be seen in FIG. 2; when there is about ~3700 s recharging time left, the recharging currents of each wall-charger type become the same. Recharging from a USB-port type charger has a somewhat different behavior and it may be distinguished from wall charging for an almost full battery 160 by simply observing the recharging current. In an alternate embodiment, the data traffic through USB-port may be observed to indicate a USB-type charger. In an alternate embodiment, an Application Programming Interface in the device 100 or the device's internal events may provide information as to whether a USB-cable is connected, indicating a USB-type charger.

Figure 4:
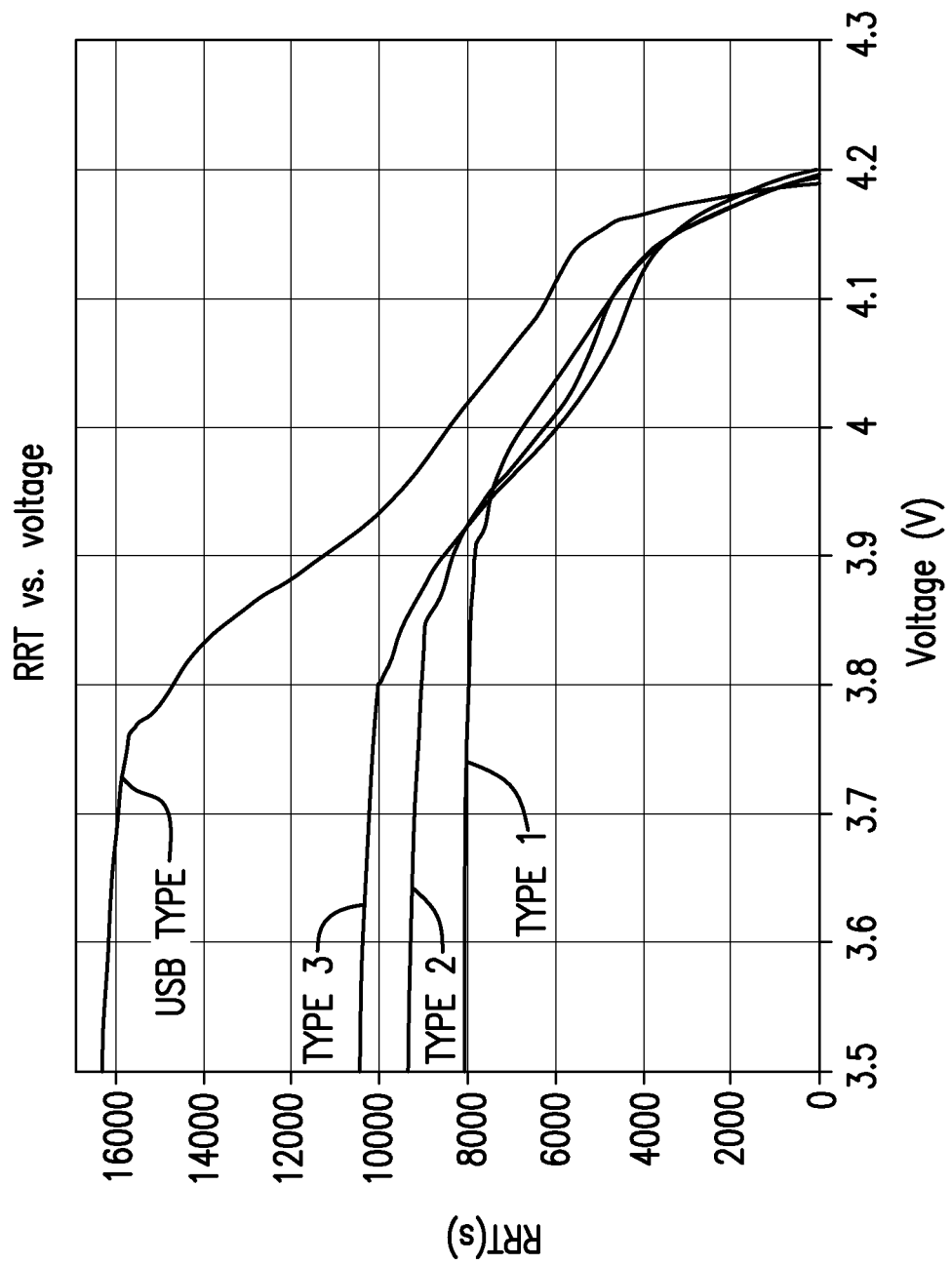
FIG. 4 is an example graph of remaining recharge time vs. voltage (for various chargers), in accordance with an embodiment of the invention.

Estimating the remaining recharging time (RRT) is a second aspect of an embodiment of the invention. This may be done more precisely once the charger type is known, by studying the RRT as a function of battery 160 voltage during recharging. FIG. 4 shows an example of the RRT as a function of battery 160 voltage during recharging for various charger adapter 50 types. If a particular battery 160 is in question and if the detected charger adapter 50 type is a type 1 charger, for example, and the battery 160 voltage may be 3.8V, then the remaining recharging time at this point may be 8000 s. On the other hand, if the detected voltage is 4.03V, then the remaining recharging time may be 6000 s. Also, if it turns out that the recharging current does not fit any charger type stored characteristics, an estimate of the RRT may still be made: either by using the closest charger match in estimating RRT or by using the two closest matches, and then calculating RRT as a weighted average of these two closest matches. Possible reasons why the recharging current of the charger adapter 50 may not fit the stored characteristic recharging currents of any known charger may comprise: 1) the charger adapter 50 may be in bad condition, 2) the charger adapter 50 may be made by an unknown manufacturer, 3) the device 100 may be operated during recharging so that part of the charger current goes to the operation of the device 100.

Figure 5:
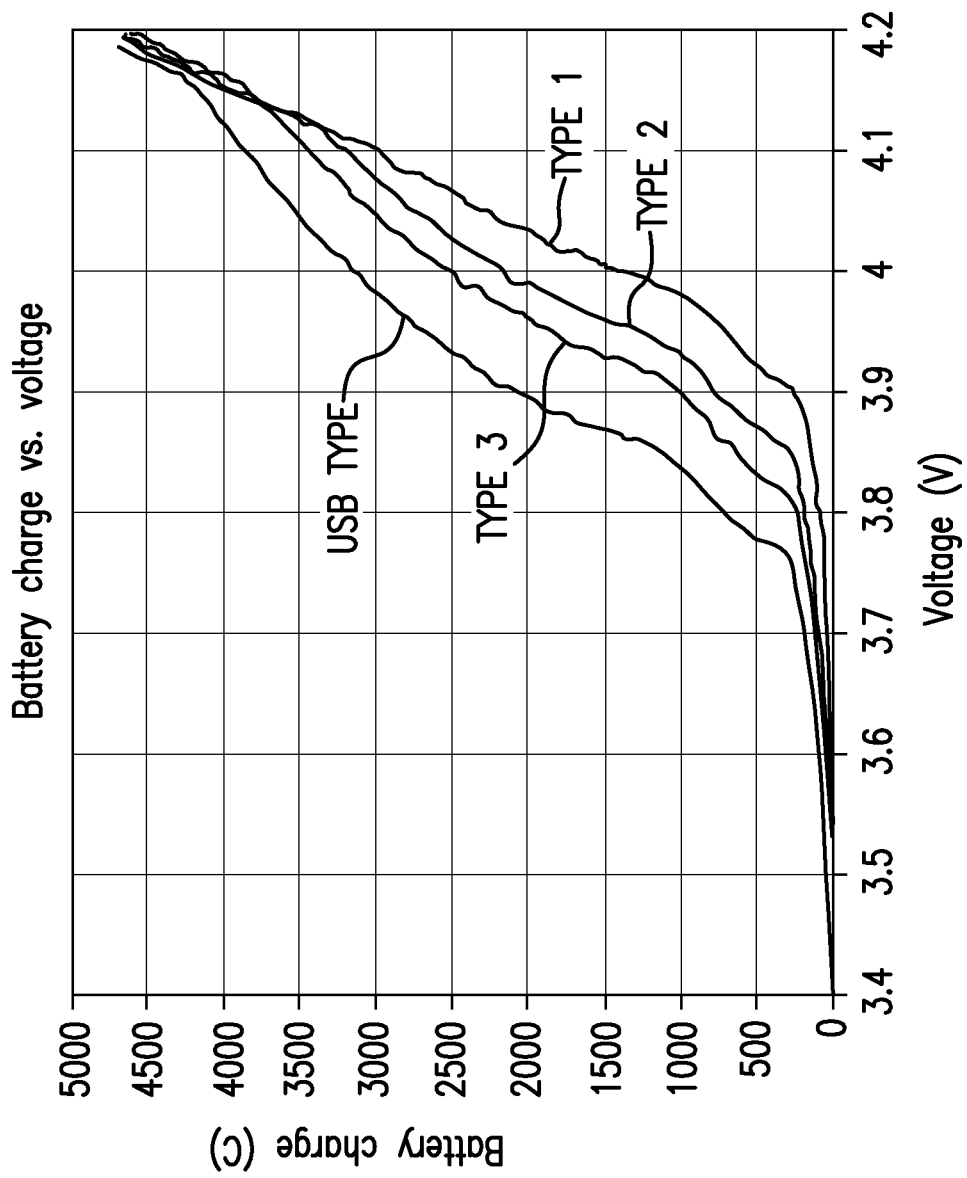
FIG. 5 is an example graph of battery charge vs. voltage (for various chargers), in accordance with an embodiment of the invention.

In addition, a similar study may be done for battery 160 charge level vs. battery 160 voltage during recharging, using dataset 230 of FIG. 5. Information obtained from this may then be used to tell the user what the battery 160 charge level is during the recharging, for example in percentages. Alternately, charge level during the recharging may also be determined by continuously integrating the charging current during recharging then adding the accumulated charge to the initial battery 160 charge value. The sum of these values is the battery 160's charge level at that point in time, which may be displayed to the user, e.g. in percentages, by comparing the value to the battery's fully charged value. In an example embodiment of the invention, the battery charge level may be expressed in various other formats, such as an arbitrary scale (for example 0-10), in graphical formats (for example, battery bars), color or shape of a symbol, remaining operating time (for example, an announcement "The current battery charge allows XX minutes of music playback or YY minutes of telephone calling.").

Alternately, the initial charge of the battery may be obtained by an estimation of the remaining energy in the battery based on momentary measurements of voltage and current (or power) of the battery. The method may comprise the following preparation steps conducted once when a new battery 160 is introduced to the device 100.

1. A battery 160 is monitored and its energy (E) vs. voltage (V) characteristics (E/V) are extracted with a small power taken from the battery (close to open circuit).

2. A mathematical function is fitted to this measured E/V curve. Alternately, the curve can be simply stored as a table.

3. A set of test loads may be applied to the battery 160 to identify the voltage drop (ΔV) as a function of current (I) (or power (P)) taken from the battery (ΔV/I or ΔV/P). The determined dependency is fitted with a mathematical formula or simply made as a table. These test loads may be made as a part of characterizing the battery and fixed formulas may be used. The test loads may be made during the operation of the device 100. The test load may be a separate calibration resistor or it may be a component (such as display backlight) whose current is known. This allows dynamic adjustment, e.g. due to the aging of the battery, temperature changes etc.

Then during the operation of the device 100, the following method may be used for discovering the remaining energy in the battery 160.

1. Momentary voltage of the battery 160 is measured.

2. Momentary current (or power) taken from the battery 160 is measured.

3. The measured voltage is corrected using the ΔV/I (or ΔV/P)—dependency to the corresponding open-circuit (close to zero current) voltage.

4. E/V curve is then used to determine the energy in the battery 160.

In summary:

1. The lower the residual stored charge in the battery 160, the more rapid will be the determination of the type of the charger adapter 50 by observing the recharging current. USB-port type chargers 50 are readily distinguished from wall chargers for charging levels approaching a fully charged battery 160, by observing recharging current. In an alternate embodiment, monitoring the USB traffic and/or using device 100s internal APIs, events or notifications may enable the determination of the charger type.

2. When estimating RRT, there is no need to know the exact charger type if different chargers behave the same way. In this case, the RRT is the same for all chargers that behave the same way.

3. If charger type cannot be detected, an estimate for RRT may still be made either by referring to the closest known charger type or by referring to the two closest matches and calculating a weighted average of the RRT, for example, from the RRTs of the closest matches.

An example embodiment of the invention may provide: [a] How to determine what charger type is used in recharging; [b] If one single charger type cannot be detected, how to determine the two closest matches; and [c] How to estimate the remaining recharging time.

In an example implementation of an embodiment of the invention, related parameters are likely to be dependent on the mobile terminal or mobile device 100 and may need to be tailored for any device 100 type behavior or battery 160 type that differs from those measured in FIGS. 2-5.

An example implementation of an embodiment of the invention may be based on the following steps:

1. Initially, a mobile device 100 type and battery 160 type dependent set of recharging measurements may be made. The measurements comprise (but are not limited to) voltage, current and time. The device 100 battery 160 combination may be recharged by a set of known chargers, adapters, or charger-adapter combinations from completely discharged state to a fully charged state. In an alternate embodiment, the recharging and the associated measurements may be made in steps, covering various ranges of battery charge between the empty and the full. The set of chargers may comprise wall-chargers intended to be used with the particular device 100. In addition, a representative set of chargers from different types of PC/Laptop USB-ports, or from any other device with a USB port, may be measured. The measurements may be repeated as many times as needed to stabilize the new battery 160 and to obtain statistical significance. Statistical significance can be defined with Chi-Square test or any other suitable method.

2. Once the measurements are done, the results may be portrayed as curves in FIG. 3, where the recharging currents of each charger type are plotted against the battery 160 voltage during the recharging, and FIG. 4, where the remaining recharging time of each charger type is plotted against the battery 160 voltage during the recharging.

3. Based on the measurements, either a lookup table, a functional fit, a fit consisting of two or more piecewise continuous functions (based e.g. on a Taylor series expansion) or any other method for representing known relationships, may be made for both the results: the recharging current I vs. the battery 160 voltage V and the remaining recharging time RRT vs. the battery 160 voltage V. Let these two tables or functions or a set of functions for charger type c be called Ic(V) and RRTc(V), respectively. In addition, a battery 160 charge vs. recharging voltage lookup table or functional fit Cc(V) may be made in a similar manner and then be used to show the user the battery 160 charge level, for example, in percentages during the recharging. Alternately, a method may also be used to first detect the initial charge of the battery 160 in the beginning of the recharging and then during the recharging integrate the recharging current and add the initial charge value to this to show what is the total charge of the battery 160, for example, in percentages during the recharging.

4. Once Ic(V) and RRTc(V) are available for various charger types and for various device 100 types or, at least, for various different battery 160 types, the values may be stored into mobile device 100's memory 126 as tables/functions or any other suitable format and be called during recharging. Alternately, the values may be stored into battery pack IC 155's memory 156 as tables/functions or any other suitable format and be called during recharging. In an alternate embodiment, there may be several combinations of suitable chargers and batteries that have been measured and stored. But, not all combinations are needed, since a limited set of measurements may be adequate to make estimations based on the available measurements, for unknown chargers 50. The data may be pre-stored or may be downloaded or updated from a server in case a new battery model or charger is available. 5. As recharging is ongoing, the Energy Management (EM) program 400 or other similar type of functionality of the mobile device 100 measures its instant current Im and its instant voltage Vm.

6. Since there may be random fluctuations in momentary current and voltage, it may be advisable to smooth the consecutive sample values over time by a suitable averaging method to smooth out the averages Iav=average(Im) and Vav=average(Vm). Smoothing can be done with Hamming window or any other suitable method. In the case of mobile device 100, averaging over 1-5 minutes may work well. Also other averaging intervals may be also suitable. If the averaging interval is too short, the results Iav and Vav may deviate significantly, or if too long, Iav and Vav may respond to changes too slowly. However, if recharging power (=I×V) is to be determined and used in estimating RRT, it may be appropriate to first multiply current with voltage, sample-by-sample, and perform the possible smoothing operation to the calculated set of power samples. Multiplying the smoothed Iav and Vav may lead to errors if both current and voltage are fluctuating at the same time.

7. Between implementation dependent time intervals dt, Iav and Vav may be updated.

8. Iav is compared against the lookup-table, function or set of functions Ic(V) to determine the charger type c. The charger type c that is determined is the one whose current best fits the recharging current of the mobile device 100 and battery 160.

9. Once the charger type c is determined, the remaining recharging time RRT may be obtained from RRT=RRTc(V). In addition the battery 160 charge level, for example, in percentages may be shown to the user as a result of C=Cc(V) or as a sum of battery 160's initial charge in the beginning of the recharging and the integrated charge from the recharge current.

10. If an unambiguous charger type c cannot be determined (for example, due to unknown charger adapter 50 or due to operation of the device 100), the two closest matches c1 and c2 are determined. They are the ones to which the differences |Iav−Ic1| and |Iav−Ic2| are the smallest.

11. If an unambiguous charger type c cannot be determined, the remaining recharging time RRT may be calculated as a weighted average of the RRTs of the two closest matches: RRT=(|Ic2|×RRTc1+|Ic1|×RRTc2)/|Ic1+Ic2|.

In addition, the battery 160 charge level, for example in percentages, may be shown as a sum of battery 160's initial charge in the beginning of the recharging and the integrated charge from the recharge current or as a weighted average of the charge levels of the two closest matches: C=(|Ic2|×Cc1+|Ic1|×Cc2)/|Ic1+Ic2|.

12. The steps 5-11 may be repeated between some implementation dependent time intervals dt to let the process go on and get RRT continuously updated during the recharging.

Figure 6:
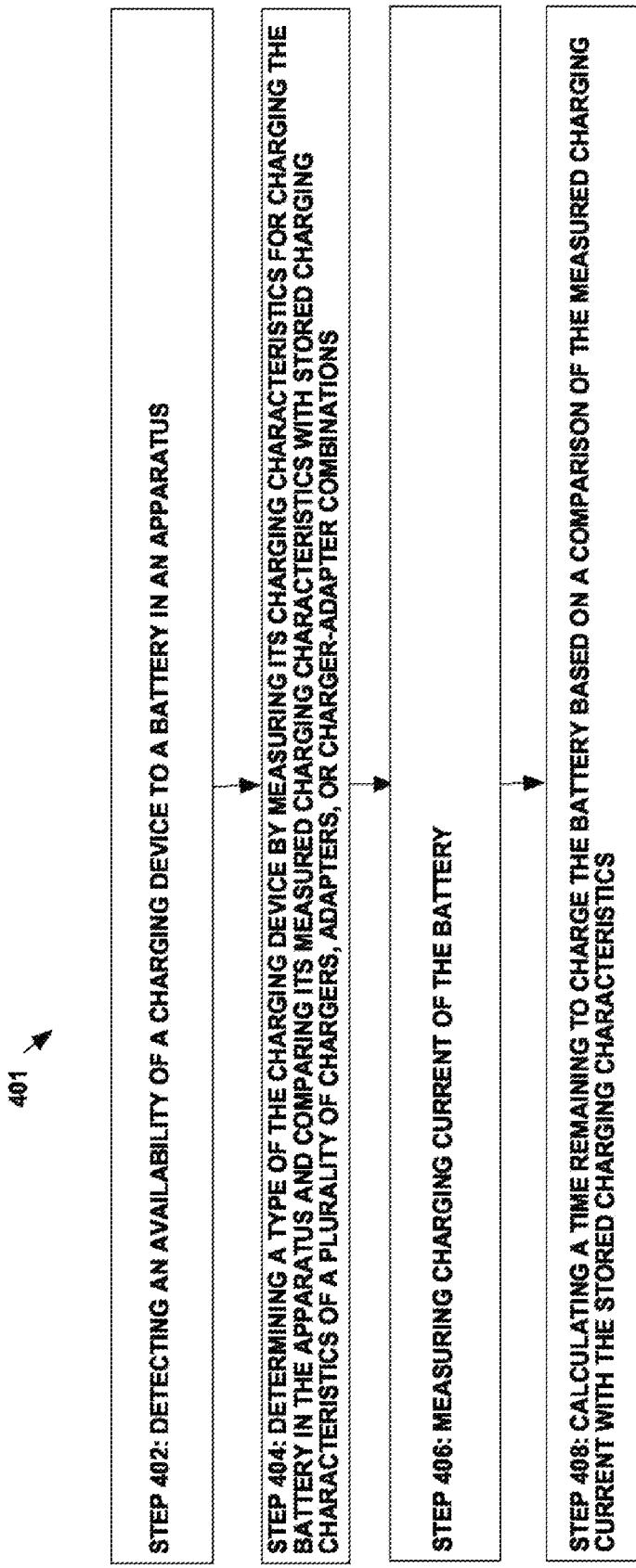
FIG. 6 is an example flow diagram of an example method for estimating the remaining charging time of a rechargeable battery, in accordance with an embodiment of the invention.

FIG. 6 is an example flow diagram 401 of an example method for estimating the remaining charging time of a rechargeable battery 160, in accordance with an embodiment of the invention, with example steps as follows:

Step 402: detecting an availability of a charging device to a battery in an apparatus;

Step 404: determining a type of the charging device by measuring its charging characteristics for charging the battery in the apparatus and comparing its measured charging characteristics with stored charging characteristics of a plurality of chargers, adapters, or charger-adapter combinations;

Step 406: measuring charging current of the battery; and

Step 408: calculating a time remaining to charge the battery based on a comparison of the measured charging current with the stored charging characteristics.

The charging device may be a charger, an adapter, or a charger-adapter combination. There may be a plurality of chargers, adapters, or charger-adapter combinations whose charging characteristics were previously measured and stored in the memory.

The steps of the flow diagram 401 of FIG. 6 represent computer code instructions stored in the RAM and/or ROM memory of the device 100 and/or the RAM and/or ROM memory of the battery pack IC 155, which when executed by the CPU, carry out the functions of the example embodiments of the invention. The steps may be carried out in another order than shown and individual steps may be combined or separated into component steps.

Figure 7:
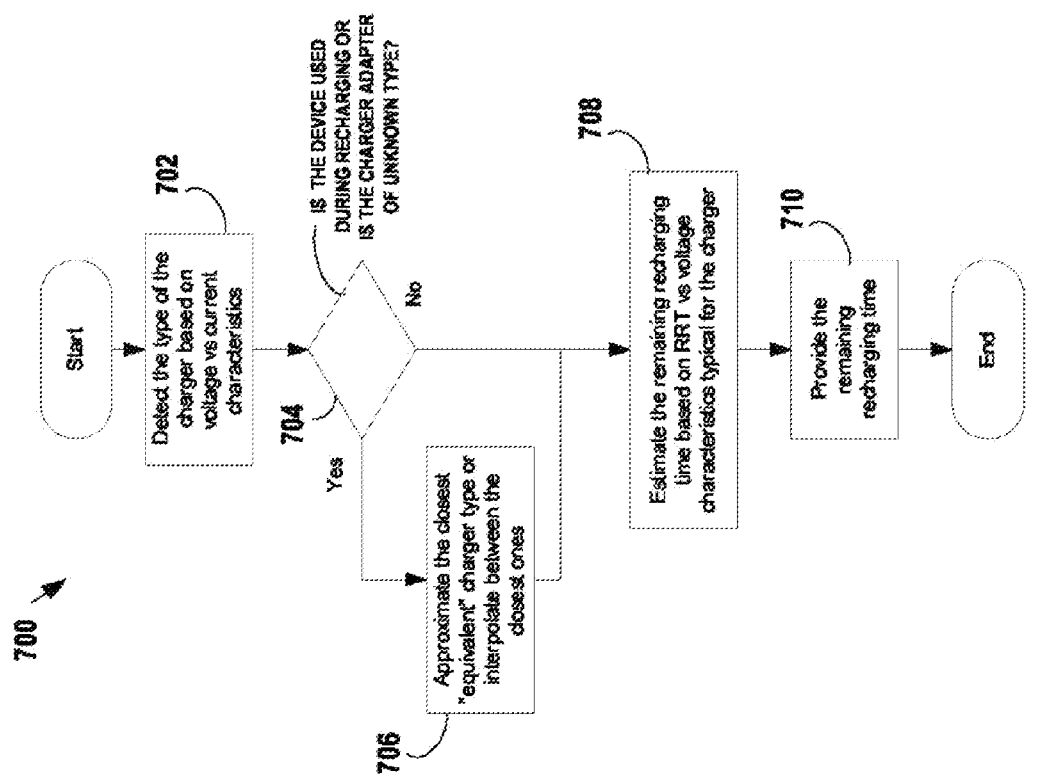
FIG. 7 is an example flow diagram of an example method to interpolate between the measured chargers and using characteristics of the closest remaining recharging time vs. voltage curves, in accordance with an embodiment of the invention.

If the device 100 is operated during recharging or the charger adapter 50 is of unknown type, then an embodiment of the invention may be able to adapt by interpolating between the measured chargers and using characteristics of the closest or e.g. two closest remaining recharging time vs. voltage curves and then base the recharging time estimate on the average of these curves. This is illustrated in FIG. 7, which is an example flow diagram 700 of an example method to interpolate between the measured chargers and using characteristics of the closest remaining recharging time vs. voltage curves, in accordance with an embodiment of the invention, with example steps as follows:

Step 702: Detect the type of the charger based on voltage vs. current characteristics.

Step 704: Is the device used during recharging or is the charger adapter of unknown type?

Step 706: If the device is being used or if the charger adapter is of unknown type, then approximate the closest "equivalent" charger type or interpolate between the closest ones.

Step 708: If the device is not being used, then estimate the remaining recharging time based on RRT vs. voltage characteristics typical for the charger.

Step 710: Provide the remaining recharging time to enable a display of the remaining recharging time.

The steps of the flow diagram 700 of FIG. 7 represent computer code instructions stored in the RAM and/or ROM memory of the device 100 and/or the RAM and/or ROM memory of the battery pack IC 155, which when executed by the CPU, carry out the functions of the example embodiments of the invention. The steps may be carried out in another order than shown and individual steps may be combined or separated into component steps.

An example embodiment of the invention comprises an apparatus, comprising:

means for detecting an availability of a charging device to a battery in the apparatus;

means for determining a type of the charging device by measuring its charging characteristics for charging the battery in the apparatus and comparing its measured charging characteristics with stored charging characteristics of a plurality of chargers, adapters, or charger-adapter combinations;

means for measuring charging current of the battery; and means for calculating a time remaining to charge the battery based on a comparison of the measured charging current with the stored charging characteristics.

Using the description provided herein, the embodiments may be implemented as a machine, process, or article of manufacture by using standard programming and/or engineering techniques to produce programming software, firmware, hardware or any combination thereof.

Any resulting program(s), having computer-readable program code, may be embodied on one or more computer-usable media such as resident memory devices, smart cards or other removable memory devices, or transmitting devices, thereby making a computer program product or article of manufacture according to the embodiments. As such, the terms "article of manufacture" and "computer program product" as used herein are intended to encompass a computer program that exists permanently or temporarily on any computer-usable medium.

As indicated above, memory/storage devices include, but are not limited to, disks, optical disks, removable memory devices such as smart cards, SIMs, WIMs, semiconductor memories such as RAM, ROM, PROMS, etc. Transmitting mediums include, but are not limited to, transmissions via wireless communication networks, the Internet, intranets, telephone/modem-based network communication, hard-wired/cabled communication network, satellite communication, and other stationary or mobile network systems/communication links.

Although specific example embodiments have been disclosed, a person skilled in the art will understand that changes may be made to the specific example embodiments without departing from the spirit and scope of the invention.

What is claimed is:

1. A method comprising the steps of:

detecting, by an apparatus, an availability of a charging device to provide charging current to terminals of a battery in the apparatus;

determining, by the apparatus, a type of the charging device by measuring its charging current into the battery and battery voltage between the terminals of the battery, as measured charging characteristics during-charging the battery in the apparatus;

comparing the measured charging characteristics with stored charging characteristics of a plurality of chargers, adapters, or charger-adapter combinations; and calculating, by the apparatus, a time remaining to charge the battery based on a comparison of the measured charging current with the stored charging characteristics.

2. The method of claim 1, wherein the charging device is a charger, an adapter, or a charger-adapter combination.

3. The method of claim 1, which further comprises:

the measuring the charging characteristics of the charging device, by charging the battery in the apparatus being from a substantially completely uncharged state to a substantially completely charged state.

4. The method of claim 1, which further comprises:

determining a charge level of the battery based on the battery's initial charge and an integrated charge from the charging current.

5. The method of claim 1, which further comprises:

interpolating stored values characterizing plural types of charging devices for an unidentified charging device type; and using the interpolated values to calculate a time remaining to charge the battery with the unidentified charging device type.

6. The method of claim 1, which further comprises:

repeating the steps of:

measuring charging current of the battery; and calculating a time remaining to charge the battery based on a comparison of the measured charging current with the stored charging characteristics.

7. An apparatus comprising:

at least one processor;

at least one memory including computer program code;

the at least one memory and the computer program code configured to, with the at least one processor, cause the processor at least to:

detect an availability of a charging device to provide charging current to terminals of a battery in the apparatus;

determine a type of the charging device by measuring its charging current into the battery and battery voltage between the terminals of the battery, as measured charging characteristics during-charging the battery in the apparatus;

compare the measured charging characteristics with stored charging characteristics of a plurality of chargers, adapters, or charger-adapter combinations; and calculate a time remaining to charge the battery based on a comparison of the measured charging current with the stored charging characteristics.

8. The apparatus of claim 7, wherein the charging device is a charger, an adapter, or a charger-adapter combination.

9. The apparatus of claim 7, which further comprises:

the measuring the charging characteristics of the charging device, by charging the battery in the apparatus being from a substantially completely uncharged state to a substantially completely charged state.

10. The apparatus of claim 7, which further comprises:

the at least one memory and the computer program code configured to, with the at least one processor, cause the processor at least to:

determine a charge level of the battery based on the battery's initial charge and an integrated charge from the charging current.

11. The apparatus of claim 7, which further comprises:
the at least one memory and the computer program code configured to, with the at least one processor, cause the processor at least to:
interpolate stored values characterizing plural types of charging devices for an unidentified charging device type; and
use the interpolated values to calculate a time remaining to charge the battery with the unidentified charging device type.

12. The apparatus of claim 7, which further comprises:
the at least one memory and the computer program code configured to, with the at least one processor, cause the processor at least to:
repeat the steps of:
measuring charging current of the battery; and
calculating a time remaining to charge the battery based on a comparison of the measured charging current with the stored charging characteristics.

13. A computer readable non-transitory medium, comprising program instructions, which when executed by a computer processor, perform the steps comprising:
detecting, by an apparatus, an availability of a charging device to provide charging current to terminals of a battery in the apparatus;
determining, by the apparatus, a type of the charging device by measuring its charging current into the battery and battery voltage between the terminals of the battery, as measured charging characteristics during-charging the battery in the apparatus;
comparing the measured charging characteristics with stored charging characteristics of a plurality of chargers, adapters, or charger-adapter combinations; and
calculating, by the apparatus, a time remaining to charge the battery based on a comparison of the measured charging current with the stored charging characteristics.

14. The computer readable medium of claim 13, wherein the charging device is a charger, an adapter, or a charger-adapter combination.

15. The computer readable medium of claim 13, comprising program instructions, which when executed by a computer processor, perform the steps comprising:
the measuring the charging characteristics of the charging device, by charging the battery in the apparatus being from a substantially completely uncharged state to a substantially completely charged state.

16. The computer readable medium of claim 13, comprising program instructions, which when executed by a computer processor, perform the steps comprising:
determining a charge level of the battery based on the battery's initial charge and an integrated charge from the charging current.

17. The computer readable medium of claim 13, comprising program instructions, which when executed by a computer processor, perform the steps comprising:
interpolating stored values characterizing plural types of charging devices for an unidentified charging device type; and
using the interpolated values to calculate a time remaining to charge the battery with the unidentified charging device type.

18. The computer readable medium of claim 13, comprising program instructions, which when executed by a computer processor, perform the steps comprising:
repeating the steps of:
measuring charging current of the battery; and
calculating a time remaining to charge the battery based on a comparison of the measured charging current with the stored charging characteristics.

* * * * *